United States Patent [19]

Arvidson

[11] Patent Number: 5,458,229
[45] Date of Patent: Oct. 17, 1995

[54] BELT CENTERING ROLLER AND MAGNETIC SEPARATOR INCORPORATING THE SAME

[76] Inventor: Bo R. Arvidson, 825 Colorow Rd., Golden, Colo. 80401

[21] Appl. No.: 354,290

[22] Filed: Dec. 12, 1994

[51] Int. Cl.$^6$ .................................................. B65G 39/16
[52] U.S. Cl. ........................................................ 198/806
[58] Field of Search ................................... 198/806, 810, 198/785, 690.1; 193/37, 356

[56] References Cited

U.S. PATENT DOCUMENTS 2,674,366   4/1954   Kindseth et al. .................... 198/806

FOREIGN PATENT DOCUMENTS 1237002   3/1967   Germany .............................. 198/806
1178047   1/1970   United Kingdom ................. 198/806

OTHER PUBLICATIONS

Kiruna Mine Tech Advertisement, "Kiruna V–Drive", 2 page Brochure Document.

*Primary Examiner*—James R. Bidwell
*Attorney, Agent, or Firm*—Timothy J. Martin

[57] ABSTRACT

A support roller and a magnetic separator incorporating the same utilizes a plurality of roller segments which are pivotally mounted to an axle member such that the roller segments are radially spaced from the axle member and extend in longitudinal parallel relation thereto. The opposite ends of the roller segments can move toward and away from the axle member. A first pair of roller segments are interconnected by a linkage that causes the first ends of the pair to move correspondingly and, due to the pivot mount, the second ends move correspondingly to one another in a direction opposite the movement of the first ends. Preferably, at least four equiangularly spaced roller segments are employed and a pair of linkages interconnect each pair of opposed roller segments. Several different linkage assemblies are disclosed. Where the support roller is incorporated in a magnetic separator, a support frame rotatably supports a magnetic roller and the support roller. A thin conveyor belt extends around the rollers to receive particulate material for separation, and a drive rotates the two rollers.

19 Claims, 4 Drawing Sheets

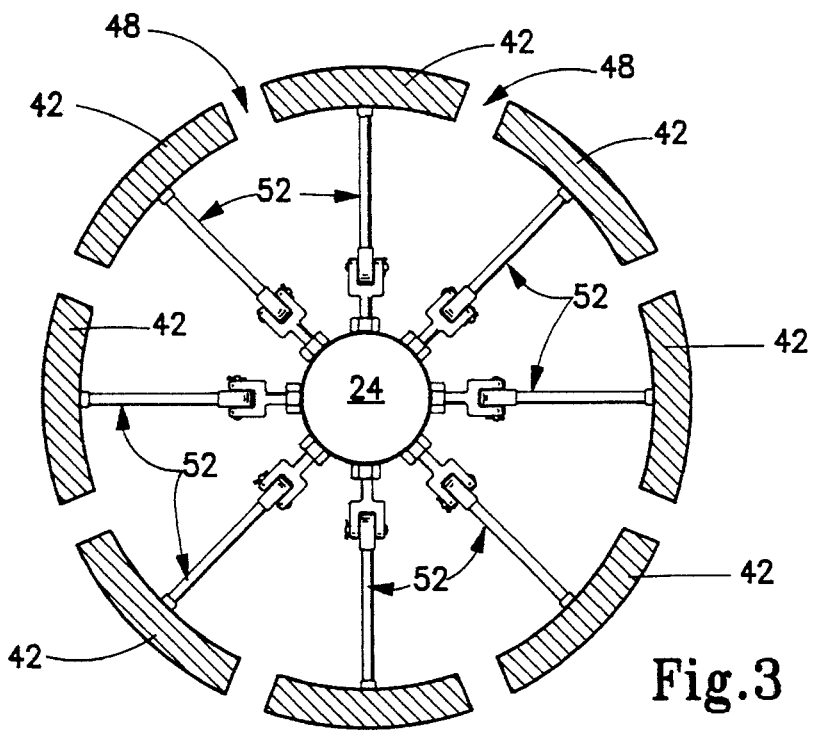
Fig.3
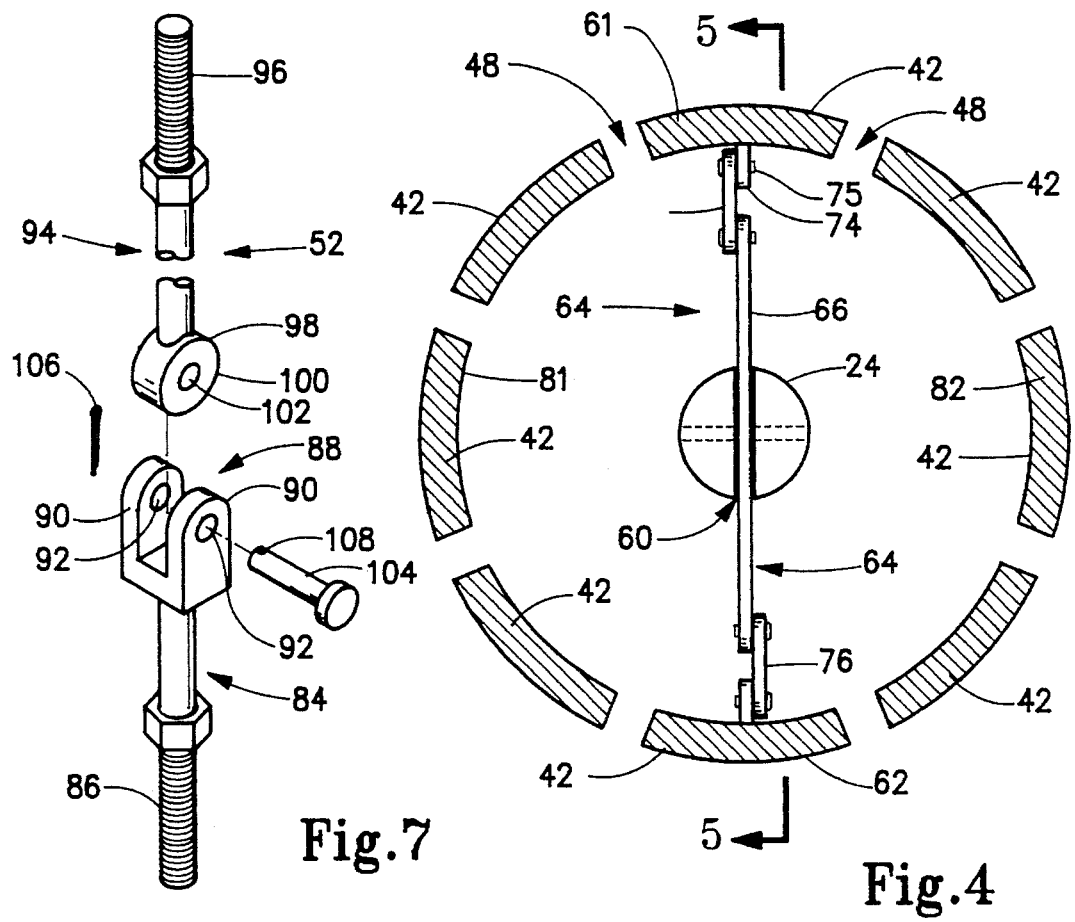
Fig.7
Fig.4

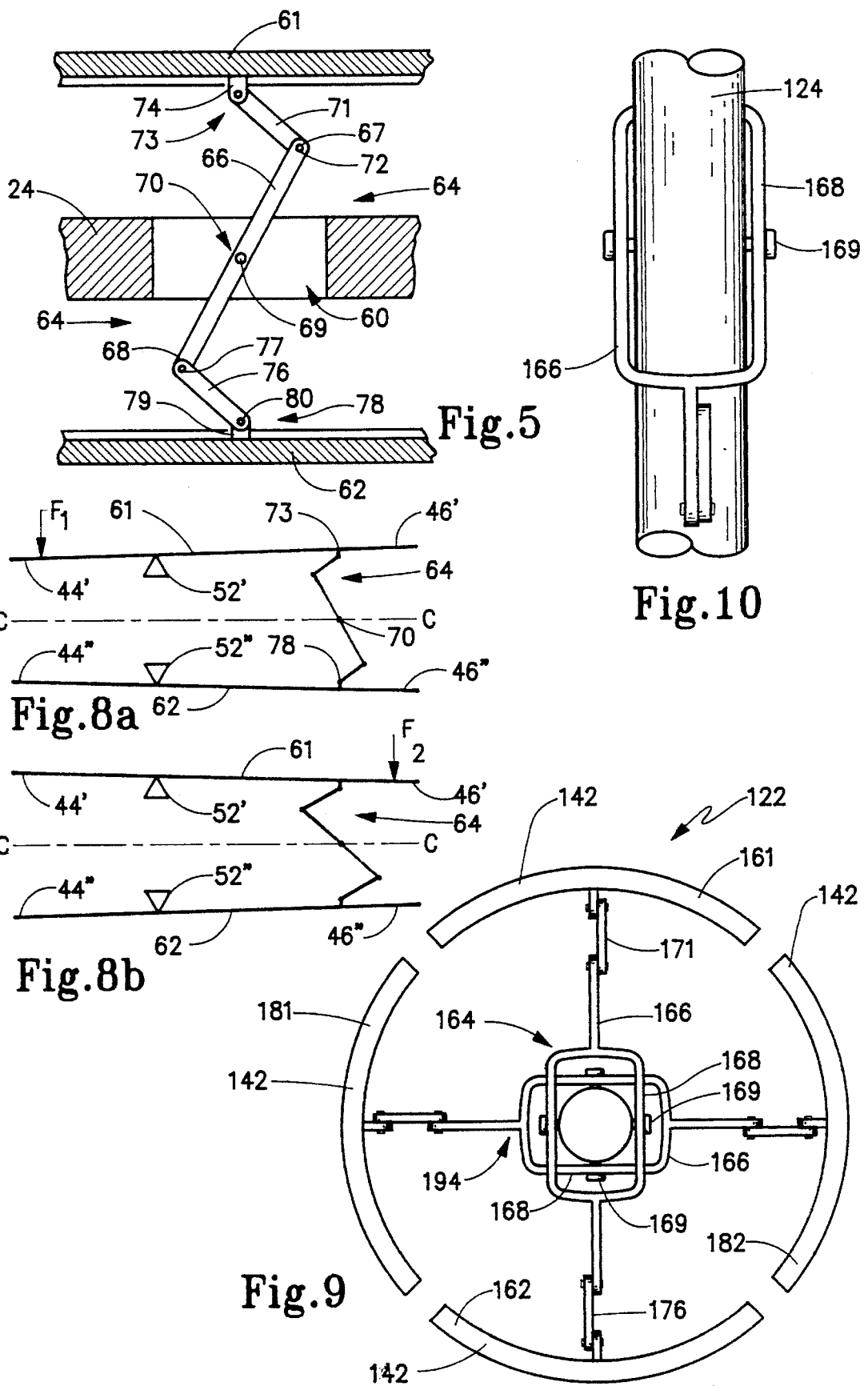

5,458,229

BELT CENTERING ROLLER AND MAGNETIC SEPARATOR INCORPORATING THE SAME

FIELD OF THE INVENTION

The present invention broadly concerns roller supports used with conveyor systems as a means of a supporting an end portion of the conveyor belt during operation. More specifically, however, the present invention is directed to belt centering rollers which are constructed to automatically compensate for lateral drift of a conveyor belt. Particularly, the present invention is directed to a belt centering roller used with magnetic separators.

BACKGROUND OF THE INVENTION

Many mechanical systems incorporate belt and roller systems for a variety of purposes. For example, some machines use a belt as an operative structure to work on material or a workpiece. In other applications, belts simply move materials or goods from one location to another. Also, belts are often employed simply to couple a power source to a machine to transmit working power thereto. In all of these applications, a belt is in the form of a continuous loop which is supported at opposite reversing ends by rollers so that the belt may cycle therearound. In some applications, of course, intermediate rollers are positioned between the two end rollers to help support the belt during use.

Regardless of the application, proper operation of these systems requires that the belt remain centered on the various rollers over which it is trained. It is well-known that belt drift may occur as the belt tracks around the rollers so that the belt may move laterally. Such belt drift, not only may interfere with proper operation of the system, but also poses a risk of injury to workers around the equipment. This is because improper alignment of the belt on the rollers may damage the belt causing it to break during use. Accordingly, various structures have been designed to reduce or eliminate belt drift during operation.

One common example of such a technique is the use of crowned rollers to support the belt. It is known that the use of shaped rollers, either crowned or convex, can sometimes reduce the tendency of the belt to drift. Other techniques attempt to physically constrain the belt during movement. For example, a roller may be provided with opposed lips between which the belt is positioned. However, should the belt track up onto the lip, damage to the belt and attendant danger to workers results. The belt may also be constrained between brackets, but due to the flexibility of the belt, this technique is not favored. Other attempts to resolve the problem of belt tracking include the incorporation of buttons, pins or rivets onto the belt itself with these structures being received in guides on the rollers. also, electronic tracking and adjustment are described, for example, in my U.S. Pat. No. 5,101,980 issued Apr. 7, 1992 and entitled Magnetic Separator Assembly For Use In Material Separator Equipment.

One of the most difficult belt tracking applications is encountered where the length of the rollers is large relative to the distance of separation between them (the "roller distance"). Magnetic separators are a prime example of equipment that requires a short roller distance. In a magnetic separator, a cylindrical magnetic roller is located at a downstream region of a conveyor and a cylindrical idler roller is located at an upstream end. A relatively thin conveyor belt encircles the magnetic roller and the idler roller. These belts are short, wide belts constructed of very thin materials. Particulate material having magnetic and non-magnetic components to be separated by the magnetic roller is deposited on an upper conveying portion of the belt so that it moves in a downstream direction across the magnetic roller. Magnetic components in the material are attracted to the magnetic roller and thus have different discharge trajectories than non-magnetic components. The use of thin belt material is necessary to achieve strong magnetic forces at the magnetic roller. Thus, the roller distance must be minimal to avoid sagging of the belt due to the load placed by the material as it is advanced. The use of shaped rollers is not generally effective where there is such a short roller distance.

A new technique for providing self centering adjustment of conveyor belts, especially in magnetic separators, has been developed. This technique is based upon the principle that a belt will move toward a higher stress point, which is the principle employed by crowned rollers to cause better belt tracking. In the new technique, however, the increased stressed region is caused by moveable sections of the idler roller which are pivotally secured to the center of the roll so that each section may pivot about a pivot axis that is orthogonal to the axis of rotation of the idler roller. When a belt drifts to one end of the idler roller, these sections are moved radially inwardly. This causes the opposite ends of the sections to move radially outwardly thereby increasing the stress on the belt and causing it to move back toward the center of the roller. It is to this technique that the present invention is directed.

SUMMARY OF THE INVENTION

It is an object of the present invention to provide a new and useful roller support which automatically self-centers conveyor belts.

Another object of the present invention is to provide a roller support for a conveyor system which incorporates a plurality of pivoting sections, at least some of which are coupled to one another for enhanced automatic belt centering.

A further object of the present invention is to provide an idler support roller for use with magnetic separators that will self-center the conveyor belt thereof without the need for electronic adjustment.

Another object of the present invention is to provide an idler support roller for a magnetic separator which will self-center the conveyor belt without requiring special mechanical attachments to the belt or special bracketing structure.

It is still a further object of the present invention to provide a roller support that may be used on short, wide conveyor belts constructed of very thin materials.

Another object of the present invention is to provide a magnetic separator incorporating a simplified idler support roller which automatically centers the conveyor belt with increased reliability.

According to the present invention, then, a roller support is adapted for use in a conveyor system that has a belt operative to convey material. The roller support includes an axle member that has a longitudinally extending central axis. A plurality of elongated roller segments are radially spaced from the axle member and are oriented longitudinally thereof and encircle the axle to form an outer surface of the roller support. The roller segments each have opposite first and second ends, and at least a first pair of the roller segments are diametrically opposed to one another. A pivot mount interconnects each roller segment and the axle member such that the first and second ends can move radially toward and away from the axle member. A first linkage assembly interconnects the first pair of the roller segments such that each of the first ends thereof are linked for common movement toward and away from the axle member and such that the second ends are also linked for common movement toward and away from the axle member.

Preferably, there are an even number of roller segments, and at least four such roller segments are provided. Here, a second pair of roller segments are also diametrically opposed to one another, and a second linkage assembly interconnects the second pair so that the first ends thereof are linked for common movement toward and away from the axle member and such that the second ends thereof are linked for common movement toward and away from the axle member. The roller segments are equiangularly spaced around the axle member and are oriented parallel to the axle member.

Several different structures for the linkage assembly are described. In one embodiment, the first and, where incorporated, the second linkage assembly is formed by an inner link pivotally mounted to the axle member at a central location. The inner link has opposite ends, and a first outer link is pivotally connected to one end of the inner link and pivotally connected at a first location to one of the roller segments of its respective pair. A second outer link is pivotally connected to the other end of the inner link and is pivotally connected at a second location to the other of the roller segments of the respective pair. Preferably, the central location, the first location and the second location are aligned with one another. The axle member may include a diametric slot extending therethrough such that the inner link passes through the diametric slot and is pivotally secured therein by a transverse pin. Alternatively, the inner link may be formed as a yoke portion extending around the axle member so that it has a pair of oppositely projecting end portions terminating respectively in the opposite ends of the inner link. The linkage assembly may also be formed as a transversely extending rhomboidal member that is oriented in a plane that is perpendicular to the axle member. Here, a plurality of links form the sides of the rhomboidal member with these links pivotally connected at the vertices of the rhomboidal member and with opposite opposed pairs of the vertices connected to the respective ones of the roller segments.

The roller segments may be constructed either as solid sections or as shell sections. The pivot mounts for each roller segment may preferably be formed by a first rod having a first rod end affixed to the axle member. A second rod has an end affixed to the roller segments, and second ends of each of the first and second rods are pivotally secured to one another. Alternatively, the pivot mounts may be formed by a pair of opposed brackets constructed out of a spring-like material and secured either to the axle member or to the roller segment. A rigid plate extends in between the brackets and is secured thereto, with the rigid plate being secured to the other of the axle member and the respective roller segment.

Where the present invention is directed to a magnetic separator, the structure includes a support frame, a magnetic roller rotatably journaled with respect to the support frame for rotation about a magnetic roller axis. An idler or support roller is rotatably mounted with respect to the support frame on an idler axle located upstream of the magnetic roller. A continuous loop conveyor belt extends around the magnetic roller and the idler roller so as to have an upper conveying portion and a lower return portion, and a drive rotates the magnetic roller for advancing the conveyor belt around the magnetic roller and the idle roller along a tracking path such that the conveying portion can receive particulate material at an upstream region and can convey the particulate material downstream and across the magnetic roller to a discharge location whereby magnetic components of the particulate material may interact with the magnetic field generated by the magnetic roller. In this structure, the idler roller is constructed to have a plurality of pivoting sections as described above.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 3 is a cross-sectional view taken about lines 3—3 of FIG. 2;

FIG. 4 is a cross-sectional view taken about lines 4—4 of FIG. 2;

FIG. 5 is a cross-sectional view taken about lines 5—5 of FIG. 4;

FIG. 7 is an exploded perspective view of the pivot mount interconnecting the roller sections of FIGS. 2–5 with the axle member of FIG. 6 according to the first exemplary embodiment of the present invention;

FIGS. 8(a) and 8(b) are graphical representations showing the functioning of the interconnecting linkage according to the present invention;

FIG. 9 is an end view in elevation, showing an alternative embodiment of the interconnecting linkage according to a second exemplary embodiment of the present invention;

FIG. 10 is a top plan view of an end portion of the axle member of FIG. 9 utilizing the second exemplary embodiment of the interconnecting linkage;

DETAILED DESCRIPTION OF THE EXEMPLARY EMBODIMENTS

The present invention broadly concerns conveyor belt systems wherein a conveyor belt is trained over a plurality of support rollers so as to continuously cycle therearound. However, this invention concerns, at the first instance, a new and useful roller support for such a conveyor system which is constructed so as to provide automatic belt centering capability. While the present invention may be employed with a variety of different conveyor systems, so that the scope of the present invention should not be unduly limited, the present invention is particularly adapted for use with magnetic separators which have short wide belts of very thin materials and short roller distances which are small in relation to the width of the conveyor. Thus, the present invention is described with particularity with respect to magnetic separators, but it should be understood that the techniques and structures described herein can be incorporated into other conveyor belt systems.

Figure 1:
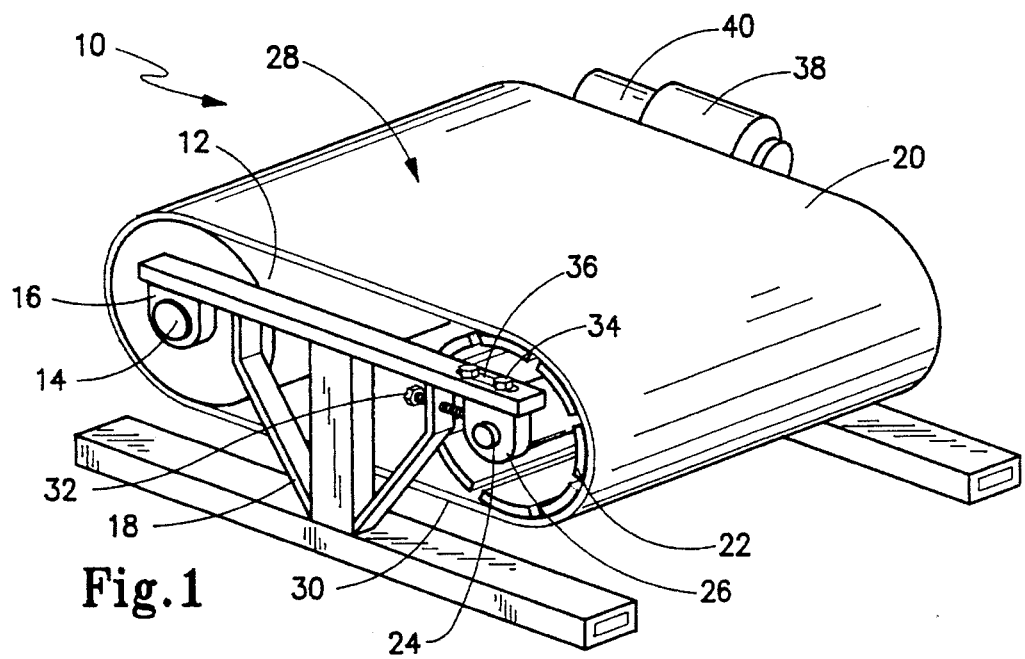
FIG. 1 is a perspective view of a magnetic separator according to the present invention.
Figure 2:
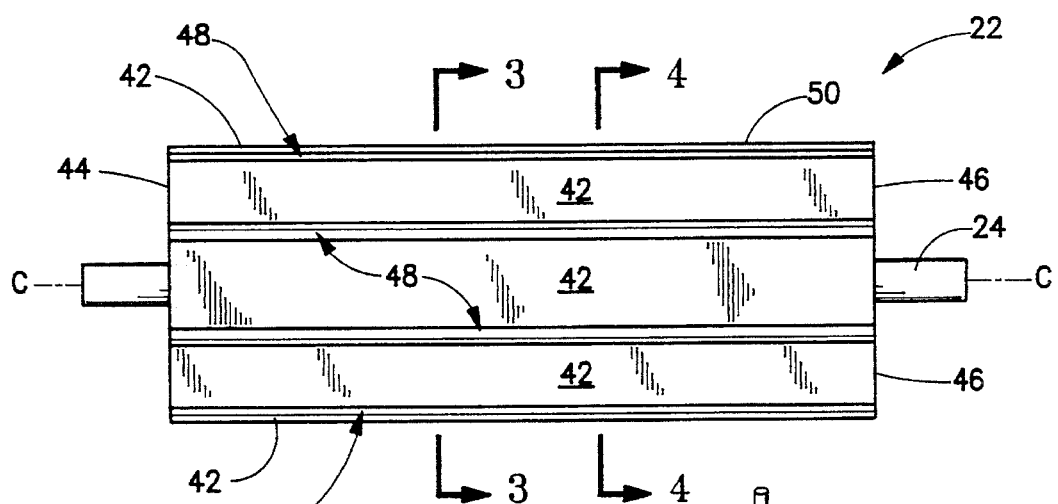
FIG. 2 is a side view of a support idler roller used with the magnetic separator of FIG. 1 and shown a first exemplary embodiment thereof.

With reference, then, to FIG. 1, it may be seen that a representative magnetic separator 10 includes a magnetic roller 12 of any suitable known construction which is rotatably journaled on a magnetic roller axle 14 on frame 18. An idler roller or support roller 22 is rotatably journaled on a support roller axle 24 rotatably journaled in pillow blocks such as pillow block 26 mounted to frame 18. A conveyor belt 20 extends around magnetic roller 12 and support roller 22 so as to have an advance portion 28 and a return portion 30. Conveyor belt 20 is preferably a relatively thin belt construction of KEVLAR® (a trademark of the DuPont Corporation) fabric. Tension on belt 20 may be adjusted by means of a screw adjustment 32 operating on pillow block 26 which is secured to frame 18 by means of bolts 34 extending through slot 36. A motor 38 acts to rotate magnetic roller 12 by means of a standard gear box 40.

The construction of support roller 22 is best shown in FIGS. 2–5. Here, it may be seen that support roller 22 includes a plurality of elongated roller segments 42 constructed as solid pieces of aluminum, steel or other suitable rigid material. Roller segments 42 each has a first end 44 and an opposite second end 46. Roller segments 42 are radially spaced from axle member 24 and are oriented longitudinally thereof. Adjacent roller segments 42 are separated by respective longitudinal space 48 with roller segments 42 being equiangularly located around axle 24 to form an outer surface 50 to support conveyor belt 20. Thus, roller segments 42 are normally parallel to axle 24. Preferably, there are an even number of roller segments such that the total number of roller segments are 2n+2 where "n" is a positive integer.

With reference to FIG. 3, it may be seen that there is a pivot mount 52 interconnecting each roller segments 42 portion and axle 24. The structure of pivot mounts 52 are described more thoroughly below with respect to FIG. 7, but it should be understood that pivot mounts 52 allow roller segments 42 to pivot so that the first and second ends thereof can be moved radially toward and away from axle member 24. That is, each of ends 44 and 46 may pivot with respect to central axis "C" of axle 24 shown in FIG. 2.

With reference to FIGS. 3 and 4, it may be seen that roller segments 42 are organized as diametrically opposed pairs, such as a first pair 61, 62 and a second pair 81, 82. With reference to FIGS. 4 and 5, it may be seen that the first pair 61, 62 of roller segments 42 are interconnected by a first linkage assembly 64 so that the first and second ends thereof are linked for common movement toward and away from axle member 24. First linkage assembly 64 is formed by an inner link 66 which extends through a diametric slot in axle 24 and is pivotally secured thereto at central location 70 by means of transverse pin 69. A first outer link 71 is pivotally secured to first end 67 of inner link 66 by means of pin 72, and is pivotally secured at a first location 73 to roller segment 61 by means of tab 74 and pin 75. Similarly, a second outer link 76 is pivotally secured to second end 68 of inner link 66 by means of a pin 77 and at a second location 78 to roller segment 62 by means of a tab 79 and pin 80. It is also preferred that the central location, such as central location 70, and first and second locations 73 and 78 are radially aligned with one another. It should also be understood that a second linkage, identical to first linkage 64, may, if desired, interconnect roller segments 81, 82 at an end of support roller 22 opposite first linkage 64.

Figure 6:
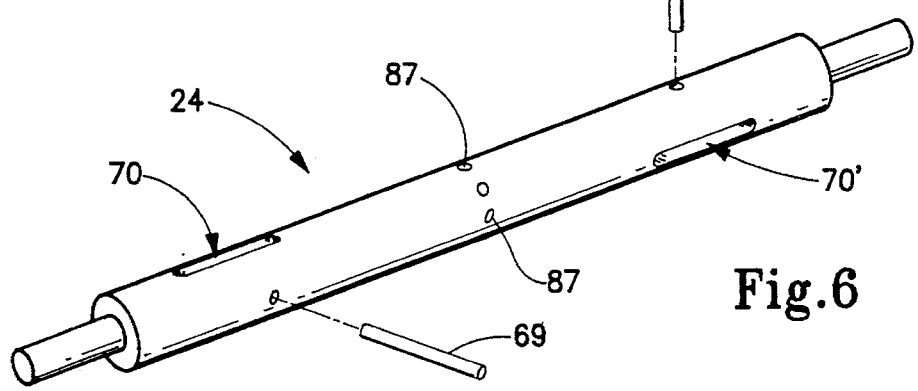
FIG. 6 is a perspective view of the axle member used in the idler support roller of FIGS. 2–5.

Axle member 24 is best shown in FIG. 6 where it may be seen that axle member 24 has a pair of diametric slots 70 and 70' operative to receive the first and second linkages described above and which are held in position by means of transverse pins 69 and 69'. A plurality of threaded openings 87 are centrally located on axle 24 to receive threaded ends 86 of first rods 84.

With reference now to FIG. 7, and again to FIG. 3, it may be seen that each pivot mount 52 is formed by a first rod 84 having a first rod end 86 that is threaded and adapted to mount into openings 87 of axle member 24. A second rod end 88 opposite first rod end 86 is formed as a fork including a pair of opposed ears 90 having aligned bores 92 therethrough. A second rod 94 has a first rod end 96 that is threaded and is secured to a threaded bore (not shown) in a respective roller segment 42. Second rod 94 has a second rod end 98 opposite first rod end 96 that is formed as an annular member 100 having an opening 102 formed therethrough. Annular member 100 is positioned between ears 90 of second end 88 and is pivotally secured thereto by means of a pin 104 and a fastening clip 106 which passes through bore 108 in pin 104. Thus, annular member 100 may rotate around pin 104 thereby allowing the first and second ends 44, 46 of each rod segment 42 to move radially toward and away from axle 24.

With reference to FIGS. 8(a) and 8(b), it may now be seen that representative linkage assembly 64 constrains the diametric pair 61, 62 of roller segments 42 to have common movement. For example, with reference to FIG. 8(a), when a collapsing force $F_1$ tends to force first end 44' of roller segment 61 radially inward toward axis "C", second end 46' moves radially away from axis C due to pivot mount 52'. Linkage 64 correspondingly causes second end 46" to move away from axis "C" equidistantly with the movement of first end 46'. Accordingly, first end 44" of roller segment 62 moves inwardly an equal amount as first end 44' due to pivot mount 52". Likewise, with reference to FIG. 8(b) when a force $F_2$ moves second end 46' toward axis "C" first end 44' moves away from axis "C". Due to linkage 64, however, second end 46" of roller segment 62 is forced to move inwardly an equidistant amount as first end 46' and, correspondingly, first end 44" of roller segment 62 moves away from axis "C" an amount equal to the movement of first end 44'.

Accordingly, should conveyor belt 20 move toward either end of roller support 22, it tends to place a radially inward force on that end thereby expanding the opposite end of the roller support. The expansion of the opposite end then increases the stress on the belt causing it to move back toward the expanded end. Therefore, any slight lateral drift of the conveyor belt is immediately and automatically corrected to cause the belt to track onto the center of roller support 22 as defined by pivot mounts 52.

A second alternative embodiment of the roller support and linkage is shown in FIGS. 9 and 10. Here, roller support 122 is formed by four roller sections 142 which are oriented parallel to an equiangularly spaced about axle 124. Roller segments 142 are again solid sections and are separated by spaces 148. Roller segments 142 are radially spaced from axle 124 similarly to that described with respect to roller segments 42, above.

As is shown in FIGS. 9 and 10, however, a modified interconnecting linkage 164 is shown which eliminates diametric slot 60 described with respect to FIGS. 4, 5 and 7. Here, inner link 166 interconnects a first pair 161, 162 of roller segments 142 and has a yoke 168 which extends completely around axle member 124 and is pivotally secured thereto by means of a diametric pin 169 which extends transversely through yoke 168 and axle 124. First and second outer links 172 and 176 are then pivotally secured to opposite ends 170 and 171 of inner link 166 and to roller segments 161 and 162 in a manner similarly to that described with respect to roller segments 61 and 62. A second linkage assembly 194 interconnects the second pair of opposed roller segments 181 and 182.

Figure 11:
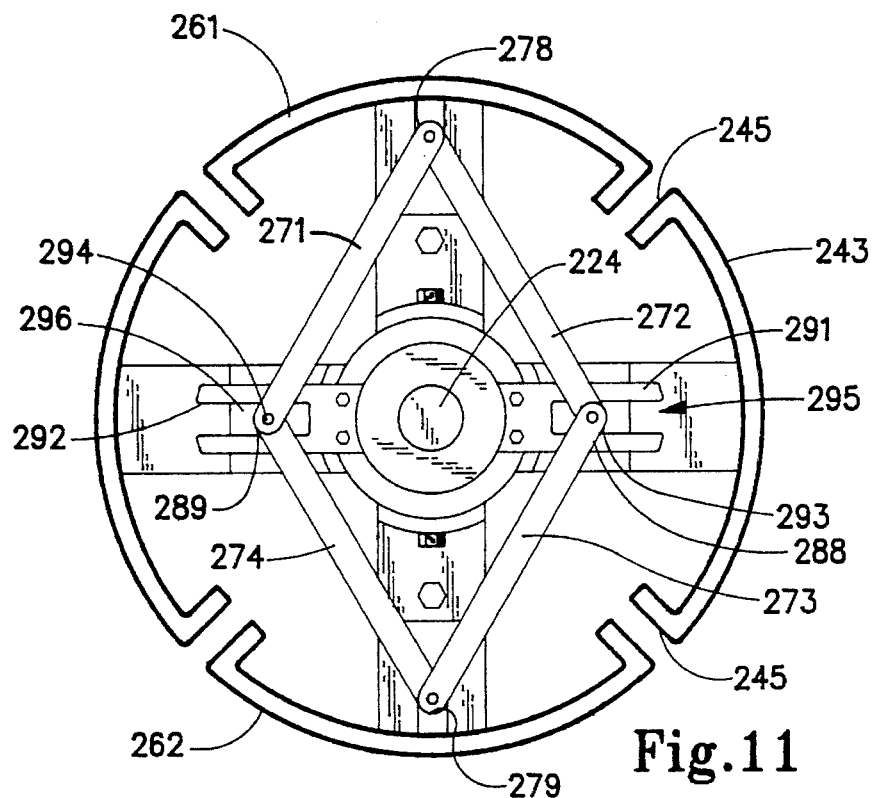
FIG. 11 is an end view in elevation showing a third exemplary embodiment of the idler support roller of the present invention and depicting an alternative pivoting mount, interconnecting linkage and roller segments.
Figure 12:
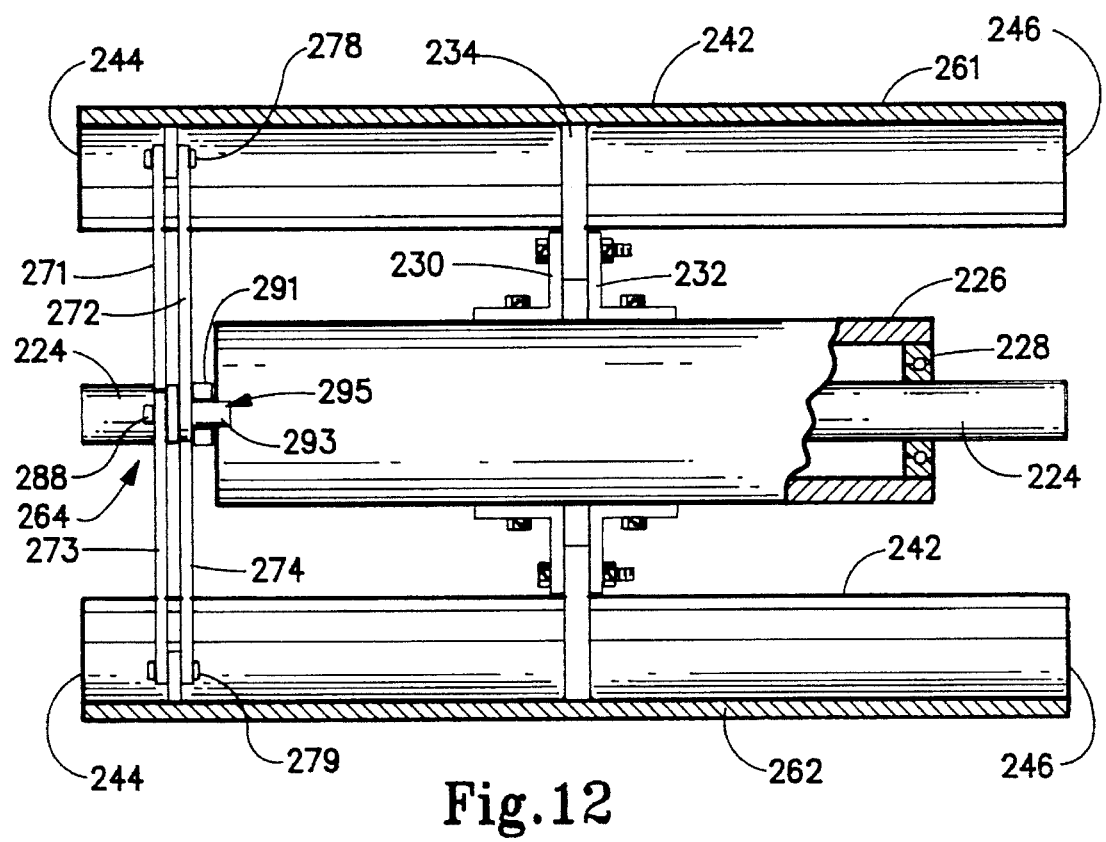
FIG. 12 is a side view in partial cross-section showing the third alternative embodiment of the idler support roller of FIG. 11.

A third exemplary embodiment of the present invention is shown in FIGS. 11 and 12. In these figures, it may be seen that axle 224 is designed to be stationary. Drum 226 is rotatably journaled on axle 224 by means of bearings 228. Each of roller sections 242 is pivotally secured to drum 226 by means of a pair of opposed brackets 230 and 232 which are constructed of a spring-like steel or other suitable material. Each roller segment 242 is provided with a rigid plate 234 which extends between brackets 230 and 232 and is held in position by means of bolts or other suitable fasteners. The flexing of brackets 230, 232 allow ends 244 and 246 of each roller segment 242 to move toward and away from axle 224 as drum 226 rotates therearound. Here, it should be appreciated that, optionally, brackets 230, 232 could be mounted on each roller segment 242 with each plate 234 mounted to drum 226.

As may also be seen in FIGS. 11 and 12, roller segments 242 are constructed as shell sections as opposed to the solid construction of roller segments 42 and 142 described above. Here, each roller segment 242 has a primary arcuate panel 243 and a pair of radially inwardly projecting flanges 245. Here, also a linkage assembly 264 interconnects a representative pair of roller segments 261 and 262. As best shown in FIG. 11, linkage 264 is formed as a transversely extending rhomboidal structure oriented in a plane that is perpendicular to axle 224. Linkage 264 includes a plurality of links 271–274 which extend around axle 224 and have opposite ends which are connected at the vertices of the rhomboidal structure. An opposed pair of vertices 278 and 279 are then pivotally connected to the opposed pair 261, 262 of roller segment 242. Vertices 288 and 289 are respectively constrained for sliding movement by bifurcated brackets 291, 292 secured to drum 226. Elongated pivot pins 293, 294 connect vertices 288 and 289 and have ends received in slots 295, 296 of brackets 291, 292. Thus, interconnecting linkage 264 constrains ends 244 for common movement toward and away from axle 224 and, due the pivotal interconnect, constrains ends 246 for common movement with one another in a direction oppositely the movement of ends 244.

Accordingly, the present invention has been described with some degree of particularity directed to the preferred embodiment of the present invention. It should be appreciated, though, that the present invention is defined by the following claims construed in light of the prior art so that modifications or changes may be made to the exemplary embodiments of the present invention without departing from the inventive concepts contained herein.

I claim:

1. A support roller adapted for use in a conveyor system that has a belt operative to convey material, comprising:

(a) an axle member having a longitudinally extending central axis;

(b) a plurality of elongated roller segments each having opposite first and second ends, said roller segments radially spaced from said axle member and oriented longitudinally thereof and encircling said axle to form an outer surface of said support roller, at least a first pair of said roller segments being diametrically opposed to one another;

(c) a pivot mount interconnecting each roller segment and said axle member whereby the first and second ends thereof can move radially toward and away from said axle member; and (d) a first linkage assembly interconnecting said first pair such that the first ends thereof are linked for common movement toward and away from said axle member and such that the second ends thereof are linked for common movement toward and away from said axle member in a direction opposite the movement of the first ends.

2. A support roller according to claim 1 wherein there are 2n+2 roller segments where n is a positive integer.

3. A support roller according to claim 2 wherein a second pair of said roller segments are diametrically opposed to one another and including a second linkage assembly interconnecting said second pair such that the first ends thereof are linked for common movement toward and away from said axle member and such that the second ends thereof are linked for common movement toward and away from said axle member in a direction opposite the movement of the first ends.

4. A support roller according to claim 2 wherein said roller segments are equiangularly spaced around said axle member.

5. A support roller according to claim 1 wherein said roller segments are parallel to said axle member.

6. A support roller according to claim 1 wherein said first linkage assembly is formed by an inner link pivotally mounted to said axle member at a central location and having opposite ends, a first outer link pivotally connected to one end of said inner link and pivotally connected at a first location to one of the roller segments of said first pair and a second outer link pivotally connected to another end of said inner link and pivotally connected at a second location to another of the roller segments of said first pair.

7. A support roller according to claim 6 wherein the central location, the first location and the second location are aligned.

8. A support roller according to claim 6 wherein said axle member has a diametric slot extending therethrough, said inner link passing through the diametric slot and pivotally secured therein by a transverse pin.

9. A support roller according to claim 6 wherein said inner link is formed as a yoke portion extending around said axle member and a pair of oppositely projecting end portions terminating respectively in the opposite ends of said inner link.

10. A support roller according to claim 1 wherein said first linkage assembly is formed as a transversely extending rhomboidal structure including a plurality of links forming sides thereof, said links pivotally connected at vertices of said rhomboidal structure with an opposed pair of the vertices pivotally connected to respective ones of said roller segments of said first pair.

11. A support roller according to claim 1 wherein said roller segments are constructed as solid sections.

12. A support roller according to claim 1 wherein said roller segments are constructed as shell sections each having a primary arcuate panel and a pair of radially inwardly projecting flanges.

13. A support roller according to claim 1 wherein said pivot mounts are each formed by a first rod having a first rod end affixed to said axle member and a second rod end opposite said first rod end and a second rod having a first rod end affixed to said roller segment and a second rod end opposite said first rod end, said second rod ends being pivotally secured to one another.

14. A support roller according to claim 13 wherein the first end of one of said first and second rods is formed as a fork having aligned transverse openings and the first end of another of said first and second rods is formed as an annular member, said fork sized and adapted to receive said annular member and including a retaining pin for pivotally securing said annular member in said fork.

15. A support roller according to claim 1 wherein said pivot mounts are formed by a pair of opposed brackets constructed out of a spring-like material and secured to one of said axle member and the respective roller segment and a rigid plate extending in-between said brackets and secured thereto, said rigid plate secured to another of said axle member and the respective roller segments.

16. A support roller adapted for use in a conveyor system that has a belt operative to convey material, comprising:
   (a) an axle member having a longitudinally extending central axis;
   (b) at least four elongated roller segments equiangularly spaced around said axle member and radially spaced therefrom, said roller segments each having opposite first and second ends and forming an outer surface of said roller support, a first and a second pair of said roller segments being diametrically opposed to one another;
   (c) a pivot mount interconnecting each roller segment and said axle member whereby the first and second ends thereof can move radially toward and away from said axle member;
   (d) a first linkage assembly interconnecting said first pair such that the first ends thereof are linked for common movement toward and away from said axle member and such that the second ends thereof are linked for common movement toward and away from said axle member; and
   (e) a second linkage assembly interconnecting said second pair such that the first ends thereof are linked for common movement toward and away from said axle member and such that the second ends thereof are linked for common movement toward and away from said axle member.

17. A support roller according to claim 16 wherein said first and second linkage assemblies are angularly oriented ninety degrees with respect to one another.

18. A material separator adapted to receive particulate material at an upstream region, to convey the particulate material in a downstream direction and to discharge said material at a downstream region in a manner whereby magnetic and non-magnetic components of said particulate material have different discharge trajectories, comprising:
   (a) a support frame;
   (b) a magnetic roller rotatably mounted with respect to said support frame and a magnetic roller axle and positioned proximate to the downstream region;
   (c) an support roller rotatably mounted with respect to said support frame on a support roller axle and positioned proximate to the upstream region, said support roller formed of a plurality of elongated roller segments having opposite first and second ends, said roller segments pivotally secured to said support roller axle and spaced radially therefrom and oriented longitudinally therealong to form an outer surface of said roller support, said support roller including a linkage assembly interconnecting a first pair of said roller segments so that the first ends thereof are linked for common movement toward and away from said support roller axle and such that the second ends thereof are linked for common movement toward and away from said support roller axle;
   (d) a continuous loop conveyor belt extending around said magnetic roller and said support roller so as to have an upper conveying portion and a lower return portion; and
   (e) drive means for advancing said conveyor belt around said magnetic roller and said support roller along a tracking path whereby said conveying portion can receive the particulate material at the upstream region and convey the particulate material downstream and across said magnet roller.

19. A separator apparatus according to claim 18 wherein said support roller includes at least four roller segments arranged as two opposed pairs and including a second linkage assembly interconnecting a second pair of said roller segments so that the first ends and the second ends thereof are respectively linked for common radial movement toward and away from said support roller axle.

\* \* \* \* \*